(12) United States Patent
Chavez et al.

(10) Patent No.: US 9,983,977 B2
(45) Date of Patent: May 29, 2018

(54) APPARATUS AND METHOD FOR TESTING COMPUTER PROGRAM IMPLEMENTATION AGAINST A DESIGN MODEL

(71) Applicant: WESTERN MICHIGAN UNIVERSITY RESEARCH FOUNDATION, Kalamazoo, MI (US)

(72) Inventors: Hector M. Chavez, Schoolcraft, MI (US); Wuwei Shen, Kalamazoo, MI (US)

(73) Assignee: Western Michigan University Research Foundation, Kalamazoo, MI (US)

( * ) Notice: Subject to any disclaimer, the term of this patent is extended or adjusted under 35 U.S.C. 154(b) by 148 days.

(21) Appl. No.: 15/118,755

(22) PCT Filed: Feb. 24, 2015

(86) PCT No.: PCT/US2015/017305
§ 371 (c)(1),
(2) Date: Aug. 12, 2016

(87) PCT Pub. No.: WO2015/130675
PCT Pub. Date: Sep. 3, 2015

(65) Prior Publication Data
US 2017/0068609 A1      Mar. 9, 2017

Related U.S. Application Data

(60) Provisional application No. 61/944,783, filed on Feb. 26, 2014.

(51) Int. Cl.
*G06F 9/44* (2018.01)
*G06F 11/36* (2006.01)
*G06F 9/455* (2018.01)

(52) U.S. Cl.
CPC ............ *G06F 11/3608* (2013.01); *G06F 8/20* (2013.01); *G06F 9/45504* (2013.01);
(Continued)

(58) Field of Classification Search
CPC .................................. G06F 11/3466–11/3608
(Continued)

(56) References Cited

U.S. PATENT DOCUMENTS

| 5,313,616 A | * | 5/1994 | Cline | .................. G06F 11/3612 713/323 |
|---|---|---|---|---|
| 5,950,004 A | | 9/1999 | Bearse et al. | |

(Continued)

OTHER PUBLICATIONS

Finding Bugs in Web Applications Using Dynamic Test Generation and Explicit-State Model Checking—Shay Artzi, Adam Kiezun, Julian Dolby, Frank Tip, Danny Dig, Amit Paradkar, Senior Member, IEEE, and Michael D. Ernst—IEEE Transactions on Software Engineering ( vol. 36, Issue: 4, Jul.-Aug. 2010 ).*

(Continued)

*Primary Examiner* — Francisco Aponte
(74) *Attorney, Agent, or Firm* — Harness, Dickey & Pierce, P.L.C.

(57) ABSTRACT

A method of testing a computer program implementation according to a predefined design model, the program implementation having at least one method under test, employs a computer to generate a post-method corresponding to the method under test. A computer is further used to automatically generate a set of test cases. Then, using the automatically generated set of test cases, the computer explores different execution paths of the computer program implementation, by applying those test cases to both the method under test and the generated post-method, to reveal behavior that is not consistent with the behavior specified by the design model.

18 Claims, 10 Drawing Sheets

(52) U.S. Cl.
CPC ...... *G06F 11/3644* (2013.01); *G06F 11/3684* (2013.01); *G06F 11/3688* (2013.01)

(58) Field of Classification Search
USPC ............................................. 717/130
See application file for complete search history.

(56) References Cited

U.S. PATENT DOCUMENTS

| | | | |
|---|---|---|---|
| 6,343,376 B1* | 1/2002 | Saxe | G06F 11/3608 706/14 |
| 6,594,783 B1* | 7/2003 | Dollin | G06F 8/427 714/38.14 |
| 6,618,769 B1* | 9/2003 | Bracha | G06F 9/44521 717/165 |
| 6,714,902 B1 | 3/2004 | Chao et al. | |
| 6,728,914 B2* | 4/2004 | McCauley | G01R 31/318385 703/14 |
| 6,789,223 B2* | 9/2004 | Fetherson | G01R 31/318328 714/738 |
| 6,986,132 B1* | 1/2006 | Schwabe | G06F 8/52 717/166 |
| 7,073,166 B2 | 7/2006 | Bera | |
| 7,080,357 B2* | 7/2006 | Foster | G06F 11/3688 707/999.101 |
| 7,089,537 B2* | 8/2006 | Das | G06F 8/433 717/126 |
| 7,120,902 B2* | 10/2006 | Flanagan | G06F 9/44589 717/130 |
| 7,146,605 B2* | 12/2006 | Beer | G06F 11/28 717/126 |
| 7,216,338 B2* | 5/2007 | Barnett | G06F 11/3672 714/38.1 |
| 7,231,635 B2* | 6/2007 | Schwabe | G06F 9/44589 714/1 |
| 7,363,618 B2* | 4/2008 | Pal | G06F 11/3696 714/38.1 |
| 7,370,296 B2* | 5/2008 | Koyfman | G06F 11/2257 714/E11.157 |
| 7,500,149 B2* | 3/2009 | Grieskamp | G06F 11/3672 714/38.12 |
| 7,574,695 B2* | 8/2009 | Chander | G06F 9/44589 717/126 |
| 7,590,520 B2* | 9/2009 | Nachmanson | G06F 11/3676 703/22 |
| 7,590,973 B1* | 9/2009 | Barry | G06F 11/3688 714/38.14 |
| 7,689,947 B2 | 3/2010 | Challenger et al. | |
| 7,689,973 B2* | 3/2010 | Kwong | G06F 11/3688 714/38.1 |
| 7,752,559 B1 | 7/2010 | Szpak et al. | |
| 7,774,757 B1* | 8/2010 | Awasthi | G06F 11/366 709/203 |
| 7,926,037 B2* | 4/2011 | Leino | G06F 11/3608 717/124 |
| 8,001,529 B2* | 8/2011 | Babut | G06F 11/36 717/124 |
| 8,069,434 B2 | 11/2011 | Ploesser et al. | |
| 8,087,005 B2* | 12/2011 | Pal | G06F 11/3696 717/124 |
| 8,166,453 B2 | 4/2012 | Kuester et al. | |
| 8,276,112 B2 | 9/2012 | Fritzsche et al. | |
| 8,387,021 B2* | 2/2013 | Vanoverberghe | G06F 11/3612 717/126 |
| 8,402,440 B2* | 3/2013 | Sankaranarayanan | G06F 11/3608 717/124 |
| 8,473,910 B2 | 6/2013 | Skriletz | |
| 8,479,171 B2* | 7/2013 | Ghosh | G06F 11/3684 717/124 |
| 8,527,954 B2 | 9/2013 | Benameur et al. | |
| 8,595,701 B2* | 11/2013 | Li | G06F 9/448 717/124 |
| 8,612,938 B2* | 12/2013 | Prasad | G06F 11/3684 717/124 |
| 8,650,546 B2* | 2/2014 | Pistoia | G06F 11/3608 717/126 |
| 8,856,751 B2* | 10/2014 | Li | G06F 8/436 717/126 |
| 9,639,454 B2* | 5/2017 | Fujiwara | G06F 11/3684 |
| 2002/0062476 A1* | 5/2002 | Saxe | G06F 8/433 717/126 |
| 2002/0083418 A1* | 6/2002 | Saxe | G06F 8/433 717/126 |
| 2002/0104067 A1* | 8/2002 | Green | G06F 8/24 717/101 |
| 2003/0097650 A1* | 5/2003 | Bahrs | G06F 11/3688 717/124 |
| 2003/0226060 A1* | 12/2003 | Das | G06F 11/3608 714/38.1 |
| 2004/0210873 A1 | 10/2004 | Tudor | |
| 2006/0248542 A1* | 11/2006 | Wang | G06F 11/3668 719/321 |
| 2007/0008892 A1* | 1/2007 | Gilfix | H04L 29/06027 370/241 |
| 2007/0033443 A1 | 2/2007 | Tillmann et al. | |
| 2007/0037521 A1* | 2/2007 | Babut | G06F 11/36 455/67.11 |
| 2007/0157169 A1 | 7/2007 | Chen et al. | |
| 2007/0180424 A1 | 8/2007 | Kazakov et al. | |
| 2007/0209032 A1* | 9/2007 | Mihai | G01R 31/31837 717/126 |
| 2007/0240097 A1 | 10/2007 | Bailleul et al. | |
| 2007/0277130 A1* | 11/2007 | Lavelle | G01R 31/318314 716/107 |
| 2008/0288834 A1* | 11/2008 | Manovit | G06F 11/28 714/718 |
| 2009/0144695 A1 | 6/2009 | Vairavan et al. | |
| 2009/0144698 A1* | 6/2009 | Fanning | G06F 8/75 717/120 |
| 2009/0168785 A1* | 7/2009 | Glazberg | H04L 47/56 370/395.42 |
| 2009/0172649 A1* | 7/2009 | Teplitsky | G06F 11/3684 717/143 |
| 2009/0319997 A1* | 12/2009 | Lichtenberg | G06F 11/3636 717/126 |
| 2010/0088679 A1* | 4/2010 | Langworthy | G06F 8/437 717/126 |
| 2011/0093916 A1 | 4/2011 | Lang et al. | |
| 2012/0079450 A1 | 3/2012 | Reech et al. | |
| 2012/0192150 A1 | 7/2012 | Li et al. | |
| 2012/0311545 A1* | 12/2012 | Li | G06F 11/3676 717/132 |
| 2013/0055028 A1 | 2/2013 | Patil et al. | |
| 2013/0103983 A1* | 4/2013 | Tzoref-Brill | G06F 11/3676 714/26 |
| 2013/0211810 A1 | 8/2013 | Aknin et al. | |
| 2013/0283101 A1 | 10/2013 | Yang et al. | |
| 2013/0318503 A1* | 11/2013 | Li | G06F 9/45529 717/126 |
| 2013/0326485 A1* | 12/2013 | Ghosh | G06F 8/313 717/126 |

OTHER PUBLICATIONS

Automatic Mutation Test Case Generation via Dynamic Symbolic Execution—Mike Papadakis and Nicos Malevris Department of Informatics, Athens University of Economics and Business Athens, Greece; Software Reliability Engineering (ISSRE), 2010 IEEE 21st International Symposium—San Jose, CA, USA.*
International Search Report and Written Opinion of the ISA for PCT/US2015/017305, ISA/US, dated Jun. 2, 2015.
Pires et al., "UML-based Design Test Generation", SAC '08—Mar. 16-20, 2008, Brazil.
Pires et al., "Checking UML Design Patterns in Java Implementation", IEEE Computer Society, 2010, pp. 120-129, DOI 10.1109/SBCARS.2010.22.

(56) References Cited

OTHER PUBLICATIONS

Moffett et al.,"Verifying UML-RT Protocol Conformance Using Model Checking", Model Drive Engineering Languages and Systems Lecture Notes in Computer Science, vol. 6981, 2011, pp. 410-424.

Faria et al., "Techniques and Toolset for Conformance Testing against UML Sequence Diagrams", Testing Software and Systems, Lecture Notes in Computer Science vol. 8254, 2013, pp. 180-195, International Federation for Information Processing 2013.

Dinh-Trong et al., "A Tool-Supported Approach to Testing UML Design Models, Engineering of Complex Computer Systems", 2005. ICECCS 2005. Proceedings. 10th IEEE International Conference, Jun. 16-20, 2005, pp. 519-528.

Crane et al., "Runtime Conformance Checking of Objects Using Alloy", Electronic Notes in Theoretical Computer Science 89 No. 2 (2003), http://www.elsevier.nl/locate/entcs/volume89.html, 20 pages.

Ciraci et al., "Checking the Correspondence Between UML models and Implementation", in: 1st International Conference on Runtime Verification, Nov. 1-4, 2010, Malta.

Bunyakiati et al., "The Compliance Testing of Software Tools with respect to the UML standards specification—the ArgoUML case study", 2009 ICSE Workshop on Automation of Software Test 138-143, abstract.

Braga et al., "Consistency of model transformation contracts", Science of Computer Programming (2013), http://dx.doi.org/10.1016/j.scocp.2013.08.013.

Barnett et al., "Model-Based Testing with AsmL. NET", in proceedings: 1st European Conference on Model-Driven Software Engineering pp. 12-19, Dec. 11-12, 2003.

Adersberger et al., "ReflexML: UML-Based Architecture-to-Code Traceability and Consistency Checking", Software Architecture Lecture Notes in Computer Science vol. 6903, 2011, pp. 344-359, Springer-Verlag, Berlin Heidelberg 2011.

\* cited by examiner

```
package loyalty;

/**
 * <!-- begin-UML-doc --> <!-- end-UML-doc -->
 *
 * @author Hector|
 * @generated        "UML to Java (com.ibm.xtools.transform.uml2.java5.internal.
 */
public class LoyaltyAccount {
    private Membership membership;
    public Membership getMembership() {
        return membership;
    }
    public void setMembership (Membership membership) {
        this.membership = membership;
    }
    private Integer points;
    public Integer getPoints() {
        return points;
    }
    public void setPoints (Integer points) {
        this.points = points;
    }
    private Integer number;
    public Integer getNumber() {
        return number;
    }
    public void setNumber (Integer number) {
        this.number = number;
    }
```

Fig. 1b

```
1 public void earn(Integer i){
2     points +=1;
3     if(points > 100){
4         membership.getCurrentLevel().setName("Gold");
5     }else{
6         if(points >= 0){
7             membership.getCurrentLevel().setName("Silver");
8         }else{
9             membership.getCurrentLevel().setName("Inactive");
10 }}}
```

Fig. 2a

```
1 public void earn(Integer i){
2     points +=1;
3     if(points > 100){
4         membership.getCurrentLevel().setName("Gold");
5     }else{
6         if(points >= 0){
7             membership.getCurrentLevel().setName("Silver");
8         }else{
9             membership.getCurrentLevel().setName("Inactive");
10 }}}
```

Fig. 2b

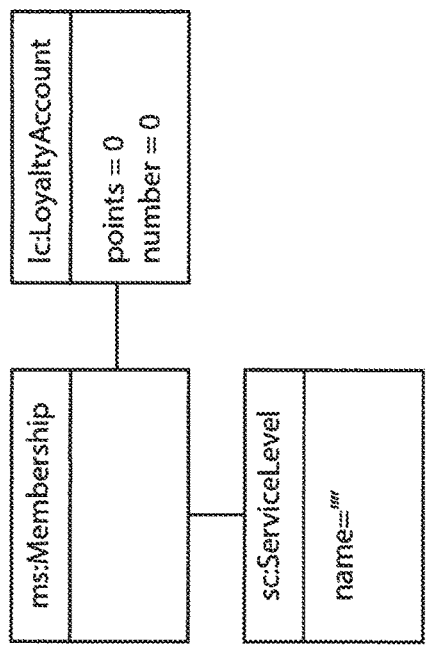

```
1   methods = parse model and select all methods with attached OCL post-conditions
2   for each m in methods
3       m_post = generate_post_method(m, DC)
4       add m_post to class of m
5   instrument program P to collect the path condition during execution
6   for each m in methods
7       init_values = null
8       testvalues = generate_testvalues(m, cd, init_values)
9       while there exists a new testvalues
10          pc = []; heap = []; pc_post = [] // empty path conditions and heap space
11          exec_symbolic(m, testvalues, heap, pc) // path conditions added by method
12          is_valid = exec_symbolic(m_post, testvalues, heap, pc)
13          if is_valid is false
14              report error and return
15          else
16              result = use SAT solver to check if pc -> pc_post is tautology
17          if result is true
18              do
19                  init_vaues = sat_find_next_init ¬(pc) // complement pc to find new path
20                  if init_values != null
21                      testvalues = generate+testvalues(m, cd, init_values)
22              while testvalues ==null && init_values != null
23          else
24              do
25                  init_values = sat_find_next_init (pc ∧ ¬pc_post // try to invalidate pc_post
26                  if init_values != null
27                      testvalues = generate_testvalues(m, cd, init_values)
28              while testvalues == null && init_values != null
```

4.1 Initialization (lines 1–5)
4.2 Execution of Methods (lines 6–16)
4.3 Evaluation and Input Generation (lines 17–28)

Fig. 5

```
1   locals = [], expStack = []
2   if params is empty then // implying unknown input
3       for each concrete parameter parameter
4           create new symbolic value
5           if (p is object) heap(p) = value
6           locals[p] = value
7   else
8       for each element of params p
9           locals[p] = params[p]
10  for each instruction insn in method
11      if (insn == read local var)
12          expStack.push(locals[var])
13      else if (insn == read field of object)
14          expStack.push(heap(object+field))
15      else if (insn == write local var)
16          locals[var] = expStack.POP
17      else if (insn == write field of object)
18          if (heap(object) is empty)
19              heap(object) = new value
20          heap(object+field) = expStack.pop
21      else if (insn == method return)
22          return expStack.pop
23      else
24          operands = []
25          for each operand op
26              operands.add(expStack.pop)
27          if (insn == stack operation with result)
28              expStack.push(new Expression(
29                  operands, operator, result))
30          else if (insn == method call)
31              expStack.push(execute_symbolic(
32                  call method, params, heap, pc);
```

Fig. 6

```
context Class::destroy() : Boolean
post: self.ownedAttribute@pre->forAll( |
    p.association@pre.memberEnd->excludes(p))
```

Fig. 8a

```
context Property::isAttribute(p: Property) : Boolean
post: result = Classifier.allInstances->exists(c |
    c.attribute->includes(p))
```

Fig. 8b

APPARATUS AND METHOD FOR TESTING COMPUTER PROGRAM IMPLEMENTATION AGAINST A DESIGN MODEL

CROSS-REFERENCE TO RELATED APPLICATIONS

This application is a 371 U.S. National Stage of International Application No. PCT/US2015/017305, filed Feb. 24, 2015, which claims the benefit of U.S. provisional application 61/944,783, filed on Feb. 26, 2014. The entire disclosures of the above applications are incorporated herein by reference.

FIELD

This disclosure relates generally to computer-implemented systems used in software development, such as in the design, implementation and testing of computer programs. More particularly the disclosure relates to computer-implemented apparatuses and methods to test a computer program code implementation against a design model.

BACKGROUND

This section provides background information related to the present disclosure which is not necessarily prior art.

Software design models are abstract forms of a solution that can be used to analyze design choices and to partially generate implementations. In many cases, inconsistencies arise between a design model and its implementation when implementations evolve independently of the model from which it was generated. Checking conformance between a design model and its implementation is extremely important if the models are to continue to serve as contracts and blueprints for the implementation as it evolves. Conformance checking can assist in the understanding of a program implementation, strengthen the communication between designers and programmers, and extend the utility of models beyond initial generation of programs. In some domains, such as embedded software systems, mature conformance checking technologies exist because of the close relationship between a modeling language and an implementation language. For example, Reactis can automatically check whether a C program conforms to a Simulink model.

Object-oriented software development has become a dominant methodology in software development. The Unified Modeling Language (UML), as a standard modeling language, is a popular language for expressing design models. In particular, UML class diagrams are widely used to describe software designs. On the programming side, Java has been extensively used as an object-oriented implementation language. Many model-driven engineering (MDE) tools can automatically generate Java skeletal programs from class diagrams to expedite the software development process. Developers often need to manually add method implementations to generated skeletal programs. Unfortunately, the completed implementation may not be consistent with the original class diagram. In addition to simple programmer errors, programmer misunderstanding of the generated structure in a skeletal program can lead to inconsistencies; the programmer would be implementing a software system based on a faulty interpretation of the generated code. Consequently, conformance checking that determines whether properties and constraints specified in a design model hold in the final implementation is needed.

The inclusion of constraints in a design model has also become an indispensable step toward building a high quality software system. Although class diagrams are well designed to describe the structural relationships between objects, they are limited in describing logical relationships that must be maintained and many constraints cannot be diagrammatically expressed in class diagrams. The class diagram itself cannot alone express all applicable constraints and object query expressions that may come into play. As a result, the UML metamodel now contains numerous constraints, or well-formedness rules, expressed in another language, the Object Constraint Language (OCL). The Object Constraint Language is a declarative language for describing rules that apply to software development models, such as UML models. It is used most commonly used to provide constraint and object query expressions, where the model diagrams alone will not suffice.

Program testing has been widely studied in the past decades and advances have been made recently. However, traditional program testing suffers two major obstacles with respect to conformance checking. First, most testing techniques, including symbolic execution techniques, do not consider pre- and post-conditions of a program under test, and they assume that the execution of a faulty statement can expose a software fault. Thus, most testing techniques adopt different coverage criteria to cover all statements including the faulty statements. Unfortunately, many errors in a program cannot be revealed based on this assumption. If a program does not have an asserting statement, then it is possible not to reveal an error even when a faulty statement is reached. By way of example, in a method that calculates the number of zeros in an array, if the programmer forgot to check the first element of the array in a FOR loop (instead of for(int i=0; . . . ), the programmer wrote for(int i=1; . . . )), no error would be revealed when the faulty i=1 statement is executed in a test case.

Second, most testing techniques flip the condition branches during the execution in order to reach different statements. However, in model-driven engineering, some advanced forward engineering tools translate a class diagram into a program that has auxiliary information. For instance, on the Eclipse Modeling Framework (EMF), the attribute eContainerFeatureID is an integer used to identify a container and specify whether it is a navigable feature or not by assigning a positive (navigable) or negative value. If the value of eContainerFeatureID is altered to cover a different execution path, as done by most testing techniques, a false positive that is not a real error can be reported.

SUMMARY

This section provides a general summary of the disclosure, and is not a comprehensive disclosure of its full scope or all of its features.

The present disclosure addresses the foregoing problems with conventional testing techniques. The disclosed technique employs a novel computer-automated test-based approach that takes into account not only the static model but also the dynamic behavior dictated by the model.

To illustrate the principles of our automated test-based approach this disclosure features an implementation that supports conformance checking between a UML design and a Java implementation. The approach checks whether a Java implementation is consistent with the OCL specifications associated with the design class diagram. Herein we refer to the disclosed UML-Java embodiment as the CCUJ approach. As will be more fully described, CCUJ uses branch-coverage criteria and efficiently prunes the test input space by means of Universal Symbolic Execution.

It will of course be understood that the techniques described here are applicable to other modeling tools (besides UML and OCL) and to other computer languages (besides Java). Examples of such languages object-oriented languages such as C#.

Thus in one embodiment, we focus on conformance checking that determines whether OCL constraints are violated in a Java implementation. To this end, we first define a translation schema that assumes (1) a UML class diagram with some OCL constraints is given, and (2) a Java skeletal program generated from the class diagram using a forward engineering tool is available. The translation schema $\Phi$ consists of two parts. The first part is concerned with the generation of Java skeletal code from a model. This part uses the Rational Software Architect (RSA) translation schema, which is based on the following rules: (1) Each UML Class is mapped to a Java class with the same name, (2) each property is mapped to a class field with setter and getter methods, where both property and class field have the same name while their setter and getter methods names are prefixed with set and get respectively, and (3) each UML operation is mapped to a Java method with the same name. (We shall refer to UML operations as methods throughout the remainder of this disclosure.) The second part of the translation schema $\Phi$ is concerned with the generation of a Java Boolean method, from an OCL constraint. This method is referred to as a post-method. For more information about OCL, reference may be had to Warmer, J. Kleppe, A., *The Object Constraint Language: Getting Your Models Ready for MDS*, Second Edition, Addison-Wesley Longman Publishing Col, Inc. Boston (2003) (Chapter 4).

A Java method satisfies its corresponding UML method in terms of $\Phi$ if the following is true: For every pre-state (the heap configuration) corresponding to a valid object diagram of the class diagram via the translation schema $\Phi$, if the method is called, on the pre-state and a post-state is generated, then the post-method derived from OCL method specification associated with the UML method returns true when invoked on the post-state. Otherwise, the method in the Java class does not satisfy its UML counterpart with respect to $\Phi$. Consequently, the Java class does not conform to its UML class with respect to $\Phi$. Likewise, if a Java class does not conform to its UML class with respect to $\Phi$, then the Java implementation does not conform to its UML class diagram with respect to $\Phi$. For brevity, we skip "with respect to $\Phi$" throughout the remainder of this disclosure.

Based on the above, the testing problem addressed by the approach described in this disclosure can be stated as follows: Given a design model consisting of a class diagram with OCL constraints, and a Java implementation, automatically generate a set of high-quality test cases to explore execution paths of the implementation to reveal behavior that is not consistent with the behavior specified in the design model.

In accordance with one aspect, the disclosed method tests a computer program implementation according to a predefined design model, where the design model is of the type having a static model component (e.g., expressed as a UML model) and a dynamic model component (e.g., expressed using OCL). The method entails identifying a method under test from within the computer program implementation; using a computer to extract the dynamic model component and generate a post-method corresponding to the method under test; using a computer to store an initial test case value having a corresponding initial input parameter set comprising at least one parameter.

Then a computer is used to instrument for symbolic execution both the method under test and the post-method and the computer is used to run the instrumented method under test and to build a first symbolic memory representation corresponding to a first execution path condition of the method under test, the first symbolic memory representation being stored in non-transitory computer-readable memory as a path condition (PC).

A computer is then used to run the instrumented post-method, and using the first symbolic memory representation to build a second symbolic memory representation corresponding to the post-method, the second symbolic memory representation being stored in non-transitory computer-readable memory as a post-method path condition (PCpost). The computer tests the returned Boolean state of the post-method path condition and stores an indication in computer memory that an error has been detected if the returned Boolean state is FALSE and to perform the following steps if the returned Boolean state is TRUE. Thereafter, a computer is used to execute a satisfiability (SAT) solver algorithm to analyze whether all members of the input parameter set satisfying the path condition PC also satisfy the post-path condition PCpost and thereby determine that PC and PCpost correspond to a tautology relationship. The computer is then used to evaluate the relationship between PC and PCpost as follows:

if a tautology relationship is found, generate a second test case value, different from the initial test case value and run the instrumented method under test and post-method again using an execution path for the method under test that is different from the first execution path condition;

if a tautology relationship is not found, generate a third test case value, having a parameter set different from the initial parameter set.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1*a* is an exemplary UML class diagram, useful in understanding the disclosed computer-automated conformance testing technique;

FIG. 1*b* is an exemplary program corresponding to the class diagram of FIG. 1*a*, the exemplary program having been generated by the Rational Software Architect (RSA) tool;

FIG. 2*a* is an exemplary excerpt of computer source code representing an implementation of the earn method, useful in understanding the disclosed computer-automated conformance testing technique;

FIG. 2*b*. is an exemplary excerpt of computer source code representing a Java method generated from earn OCL post-condition.

FIG. 3*a* is an exemplary object diagram useful in understanding the disclosed computer-automated conformance testing technique;

FIG. 3b is exemplary computer source code to generate the object diagram of FIG. 3a;

FIG. 5 is a pseudocode representation of a presently preferred CCUJ algorithm;

FIG. 6 is a pseudocode representation illustrating a symbolic execution algorithm;

FIG. 8a is a UML meta-model OCL post-conditions listing illustrating the post-condition for the destroy method;

FIG. 8b is a UML meta-model OCL post-conditions listing illustrating the post-condition for the isAttribute method.

Corresponding reference numerals indicate corresponding parts throughout the several views of the drawings.

DETAILED DESCRIPTION

Figure 1A:
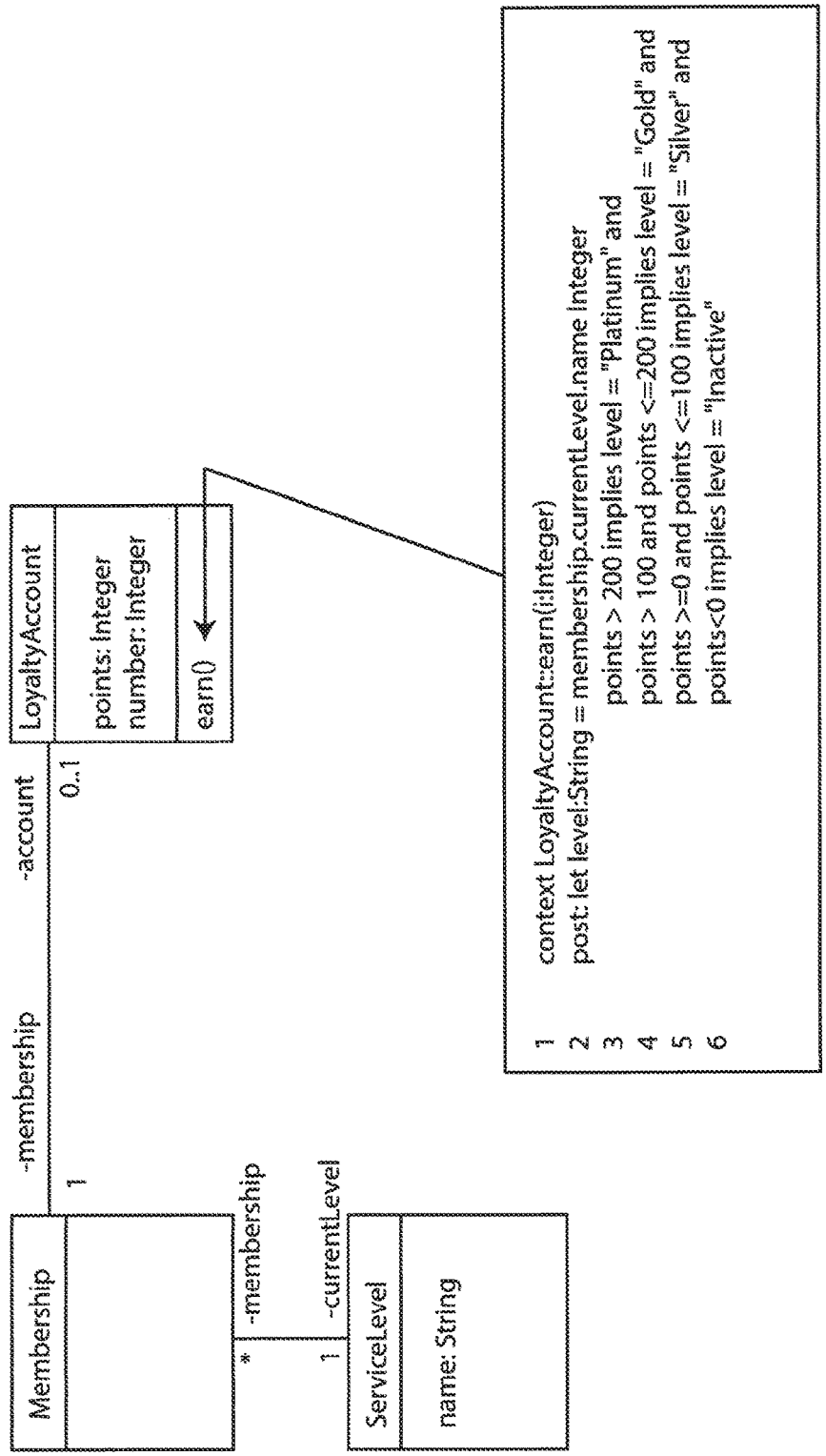

Example embodiments will now be described more fully with reference to the accompanying drawings.

The principles of the invention are applicable to a variety of different modeling tools and computer languages. To facilitate the explanation here the UML modeling system and OCL constraint language tools have been featured in connection with the object-oriented language Java. The techniques described here may be utilized with other modeling systems, other constrain languages and other computer languages.

Conformance checking between a UML class diagram and its Java implementation can be done either with formal verification or testing-based validation techniques. While formal verification has made some progress in past decades, they often do not scale effectively to real-world applications due to the complexity that arises with the increasing size of software. Thus, in this disclosure we adopt testing-based validation to support conformance checking. Specifically, we use a model-based testing approach, which characterizes by leveraging a program's model information for the generation of test cases. In general, a static defect in the software is called a software fault, The software whose implementation needs to be tested is called the software under test. The input values/pre-state necessary to complete some execution of the software under test are called test case values. A test oracle specifies the expected results/post-state for a complete execution and evaluation of the software under test. A test case consists of test case values and test oracles for the software under test.

In the case of conformance checking between a UML class diagram and its Java implementation, the software under test is the method that we want to test so the method is called the method under test. A post-condition of a method in a class diagram is converted to a Java method, called a post-method, which serves as a test oracle for the corresponding Java implementation. The pre-conditions of a method in a class diagram are used to eliminate invalid test case values. In addition to satisfying preconditions, a test case value must also be a valid object diagram, i.e. it must satisfy all constraints given in the class diagram such as navigability and multiplicities. The goal of conformance checking is to find a fault in a method such that the post-condition is violated, i.e. returns false, after the method under test is called on a valid test case value. Every method specification (pre- and post-conditions) in a class includes all class invariants specified in a class diagram, that is, every class invariant in a class can be used as a pre- and post-condition for a method.

As noted above, most testing techniques flip the condition branches during the execution in order to reach different statements. However, in MDE, some advanced forward engineering tools translate a class diagram to a program that has auxiliary information. The conventional automated testing technique programmatically alters this auxiliary information in an effort to "test" all condition branches. However, this approach can lead to false positives where a condition that is not a real error is reported as an error. To avoid this issue, CCUJ only tracks fields that are directly derived from the program's class diagram.

An Illustrative Example

Consider the simple class diagram in FIG. 1 (a) which is excerpted from the Royal and Loyal system example. An OCL constraint is attached as a post-condition to method earn( ). The code generated by Rational Software Architect (RSA) is partially shown in FIG. 1 (b), where each property is mapped to private class fields with the setter and getter methods. We show how CCUJ can be used to check whether the implementation of earn( ) shown in FIG. 2 (a) conforms to the class diagram shown in FIG. 1 (a). Specifically, we check if the implementation satisfies the only OCL constraint in the class diagram. In short, CCUJ takes as input a class diagram that includes method earn( ) and its OCL post-condition, shown in FIG. 1 (a), and its implementation, as shown in FIG. 2 (a).

As a first step, CCUJ parses the class diagram to extract the corresponding OCL post-condition for the method under test, and it automatically generates the Boolean Java post-method post_earn( ) shown in FIG. 2 (b). Next, CCUJ uses the class diagram and the translation schema $\Phi$, to match elements between the diagram and implementation, to produce a test case value for method earn(i:Integer). Recall from Section 2 that every test case value should correspond to an object diagram. The correspondence relation between a pre-state and an object diagram is given by a heap configuration. Note that in the Java runtime environment, every created object is allocated a space in the heap area. Here, the equivalence between a test case value and an object diagram means that every object in the diagram has a space starting with address s_o, allocated in the heap area; and each value for an attribute of an object should be assigned the corresponding value via $\Phi$ in the corresponding heap location of the space allocated for an object's attribute.

To generate an object diagram of FIG. 3 (a), CCUJ uses $\Phi$ to produce the program shown in FIG. 3 (b). The execution of the program produces the first test case value/pre-state. Next, CCUJ calls method earn( ) on the test case value and employs symbolic execution to guide the generation of further test case values. To tailor symbolic execution for the conformance checking, CCUJ tracks all object references, class fields, and method parameters derived from a class diagram.

Figure 4:
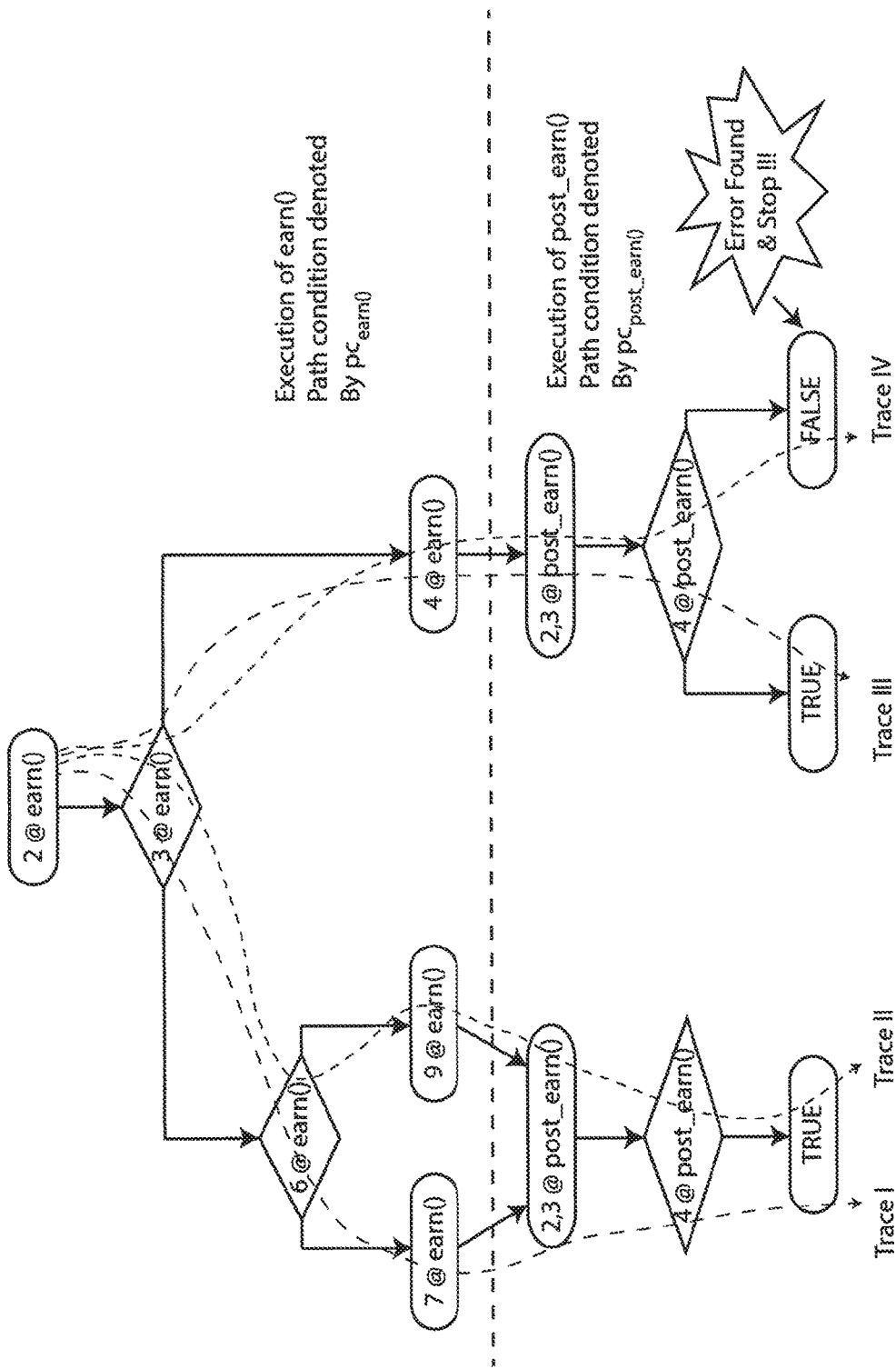
FIG. 4 illustrates different execution paths (traces) explored by the CCUJ.

During symbolic execution, each statement updates the symbolic memory or the path condition based on previous symbolic values in the symbolic memory. The initial symbolic memory of eam( ) is obtained by executing the program in FIG. 3 (b) and the path condition is initialized to true. Next, we show how CCUJ can reveal an error in method earn( ):

Trace I (FIG. 4):

The first execution based on the test case value, shown in FIG. 3 (*b*), starts with the execution of statement 2 at earn (FIG. 2 (*a*)).

As a result, CCUJ updates the symbolic memory by creating symbolic variable $3 for parameter i and updating $0.points to $0.points+$3 where $0 denotes the object of LoyaltyAccount (row 1 in Table 1).

Next, the execution takes the else branch of the first if statement (line 3 of earn( )) and the then branch of the second if statement (line 6 of earn( )). Thus, the path conditions for earn( ), denoted by $pc_{earn(\ )}$, is $\neg(\$0.points+\$3>100) \wedge \$0.points+\$3>=0$.

Next, CCUJ continues to call the post-method post_earn( ) and the then branch of the first if statement (line 4 of post_earn( )) is taken. Thus, the path condition of post_earn( ), denoted by $pc_{post\_earn(\ )}$, is $\$0.points+\$3<=200 \wedge \$0.points+\$3<=100 \wedge \$0.points+\$3>=0 \neg \$2.name="Silver"$.

If method post_earn( ) returns false, then CCUJ reports that a software fault is found. Otherwise, CCUJ calls the SAT solver to find whether $pc_{earn(\ )} \rightarrow pc_{post\_earn(\ )}$ is a tautology. If the implication relationship is a tautology, then all test case values satisfying $pc_{earn(\ )}$ do satisfy $pc_{post\_earn(\ )}$ and take the same path in earn( ) and post_earn( ).

Thus, CCUJ looks for another test case value, i.e. another valid object diagram, by calling the SAT solver. In Trace I post_earn( ) returns true and $pc_{earn(\ )} \rightarrow pc_{post\_earn(\ )}$ is a tautology so CCUJ searches for another test case value as follows:

Trace II (FIG. 4):

CCUJ calls the SAT solver to find a new test case value satisfying $\neg(\$0.points+\$3>100) \wedge -(\$0.points+\$3>=0)$, to enforce a different execution path. Here CCUJ uses a last-input-first-output stack to store the path conditions collected during execution following a back-tracking approach. Thus, $0.points+$3>=0 is popped and flipped. In this case, the SAT solver returns an assignment that is used to generate the test value $0.points=0 and, $3=−1.

Next, CCUJ generates another simple object diagram with $0.points=0 and $3=−1, and uses Φ to produce a new test case.

During this execution, CCUJ collects the two path conditions from the execution of earn( ) and post_earn( ), i.e. $\neg(\$0.points+\$3>100) \wedge \$0.points+\$3<0$, denoted by $pc_{earn(\ )}$, and $\$0.points+\$3<=200 \wedge \$0.points+\$3<=100 \wedge \$0.points+\$3<0 \wedge \$2.name="Inactive"$, denoted by $pc_{post\_earn(\ )}$ respectively.

Again post_earn( ) returns true and $pc_{post\_earn(\ )} \rightarrow pc_{post\_earn(\ )}$ is found to be a tautology by the SAT solver. CCUJ tries to find another test case value to alter the execution path of earn( ) as follows:

Trace III (FIG. 4):

CCUJ next flips the first sub-path condition to $0.points+$3>100 and sends it to the solver. The solver returns ($0.points=0, $3=150), and CCUJ generates another set of test values, and calls method earn( ) again.

The two path conditions collected by CCUJ for earn( ) and post_earn( ) are $\$0.points+\$3>100$, denoted by $pc_{earn(\ )}$, and $\$0.points+\$3<=200 \wedge \$0.points+\$3>100 \wedge \$0.points+\$3>=0 \wedge \$2.name="Gold"$, denoted by $pc_{post\_earn(\ )}$.

While post_earn( ) returns true, the SAT solver finds that $pc_{earn(\ )} \rightarrow pc_{post\_earn(\ )}$ is not a tautology for Trace III. Therefore some test values that satisfy $pc_{earn(\ )}$, following the same execution path of earn( ) in Trace III, do not follow the same execution path of post_earn( ) in Trace III. So, a different execution path of post_earn( ) should be explored to check whether false can be possibly returned. Thus, CCUJ attempts to find a test case value which alters the execution path of post_earn( ) as follows:

Trace IV (FIG. 4):

CCUJ sends $pc_{earn(\ )} \wedge \neg pc_{post\_earn(\ )}$ to the SAT solver which returns ($0.points=0, $3=220) and a new test case value is found and generated by CCUJ.

Finally, method post_earn( ) returns false on this test case, which means method earn( ) does not satisfy the post-condition defined in the class diagram. So a fault is found.

TABLE 1

| Line No. | Stmt | Symbolic Memory | Path Condition |
|---|---|---|---|
| 2@earn( ) | points+=i | Ic−>$0;ms−>$1;sc=>$2;$0.membership−>$1;$1.loyaltyAccount−>$0; $1.serviceLevel−>$2;$2.membership−>$1;this−>$0;i−>$3;$0.points−>$0.points+$3 | True |
| 3@earn( ) | If(points>100) | Same as the above | !($0.points+$3>100) |
| 6@earn( ) | if(points>=0) | Same as the above | !($0.points+$3>100) and $0.points+$3>=0 |
| 7@earn( ) | membership.getCurrentLevel( ).setName("Silver"); | Ic−>$0;ms=>$1;sc−>$2;$0.membership−>$1;$1.loyaltyAccount−>$0; $1.serviceLevel−>$2;$2.membership−>$1;this−>$0;i−>$3;$0.points−>$0.points+$3;$2.name−>"Silver" | Same as the above |

TABLE 1-continued

| Line No. | Stmt | Symbolic Memory | Path Condition |
|---|---|---|---|
| 2,2@post_earn( ) | String level= this.getMembership( ).getCurrentLevel( ).getName( ); r0=false | lc->$0;ms->$1;sc->$2;$0.membership->$1;$1.loyaltyAccount->$0;$1.serviceLevel->$2;$2.membership->$1;this->$0;$0.points->$0.points+$3;$2.name->"Silver";levelV>$4;r0->$5;$5->false | True |
| 4-7@post_earn( ) | If(!(this.getPoints( )>200\|\|...) | Same as the above | ($0.points+$3)<=200 and ($0.points+$3)<=100 and ($0.points+$3)>=0 and $2.name="Silver" |
| 8@post_earn( ) | return r0; | Same as the above | Same as the above |

CCUJ Algorithm

Conformance checking in CCUJ requires a UML class diagram containing OCL constraints and a Java implementation of the diagram. The OCL constraints are extracted from the model and translated into a Java post-method. The program including both the methods under test and their post-methods is instrumented for symbolic execution. Each method under test is tested separately, but with the same procedure. For the first execution, only a minimal necessary set of objects is created.

The method under test is executed concretely with concurrent symbolic execution from which a symbolic path condition is collected. The method's post-method is executed in the same manner to collect a post-method's return value and symbolic path condition. If an error is not found, new test case values are generated to exercise a different path condition than the previously collected. The testing process is repeated with the new calculated test case values until all reachable branches have been covered or an error is found. This testing process is described in the pseudocode below and explained in more detail in the following sections.

4.1 Initialization of CCUJ

To translate OCL expressions to Java code we adopt the Object Constraint Language version OCL 2.3.1 specification, available from the organization OMG (www.omg.org) and use the translation schema introduced by Warmer et al., To perform the translation, CCUJ takes as input a class diagram and the method under test with its corresponding OCL post-condition expression. Using the Eclipse Model Development Tools OCL project (MDT OCL), the OCL expression is parsed and returned as an abstract syntax tree. CCUJ traverses the tree to form an equivalent Boolean Java method and adds it to the class where the method under test resides (FIG. 5, line 3-4).

To allow for concurrent concrete and symbolic program execution the Java program is compiled and the resulting class files are instrumented using the ASM Java bytecode manipulation and analysis framework. Instrumentation at the bytecode level allows for fine-grained replication of the concrete memory in symbolic memory. (FIG. 5, line 5).

Initially, CCUJ attempts to generate the simplest valid test case values. Null is used for all reference type method parameters, and primitives are given default values. The current implementation does not consider floating point numbers due to limitations of SAT solvers. The UML diagram is parsed to determine what minimal set of object relationships are required. Recall a test case value denotes a heap configuration equivalent to a valid object diagram. If the method under test is an instance method then an object of the class is instantiated and all its related associations are evaluated. Associations that require one or more instances of another class must also be instantiated and their respective associations must be evaluated recursively. As with the input parameters, non-required references are set to null and primitive fields are assigned default values. Upon completion of the process, a simplest test case value corresponding to a minimal heap configuration that conforms to the UML class model should be produced.

4.2 Execution of Methods

Once a test case value has been created with the input parameters set, the method under test is called. First, the method under test is called with an empty symbolic object heap (FIG. 5, line 11). The symbolic execution of a method identifies all discovered values as inputs and builds its memory representations from these values and the program constants. During execution, the path conditions evaluated on branches are collected and added to the symbolic path condition. More explanation of the symbolic execution process is provided below.

The execution of the post-method is slightly different in that it is given the symbolic memory constructed during the test method execution. Using this common memory allows the path conditions collected by the post-method to be expressed in terms of the same inputs (FIG. 5, line 12). During the execution of both methods program constants and discovered inputs are tracked. New values derived from them are tracked as expressions over these inputs. Like the method under test, the post-method collects a symbolic path condition.

The symbolic execution approach shown in Table 1 corresponds to a use of Universal Symbolic Execution, as more fully described in Kannan, Y., Sen, K., Universal Symbolic Execution and its Application to Likely Data Structure Invariant Generation, Proceedings of the 2008 International Symposium on Software Testing and Analysis, New York, N.Y., pp 283-194 (2008). For each concrete value found during the execution of the method under test, a symbolic value is assigned. The execute symbolic method's parameter params shown in FIG. 6 is a list of known symbolic values for the method's parameters. The heap parameter is a mapping of known objects and object fields to symbolic values. The pc variable is a list of path condition expressions to which this method will add. The pc is expected to be empty when the method under test is started. (Line numbers in the remainder of this discussion of Execution of Methods refer to FIG. 6.)

For each monitored method in the call stack, a list of symbolic values is associated with the local variables (line 1). An expression stack (line 1) is used to evaluate runtime expressions. If no symbolic values are known for the input parameters (line 2), then new symbolic values are created (line 4) and added to the heap if not recognized (lines 5-6). Otherwise, the supplied values are associated with the corresponding local variables (lines 7-9).

Each instruction in the method under test, and possibly its subroutines, is mimicked in symbolic memory. Each time a local variable or object field is read (lines 11, 13) its symbolic value is pushed onto the expression stack (lines 12, 14). Conversely, when a value is assigned to local variable or object field (lines 15, 17), the value is popped off the stack and stored in the appropriate data structure (lines 16, 20). If an object value is not recognized, it is added to the heap (lines 18-19). Stack operations, branches, and method calls, can have multiple operands. These operands are popped off of the stack (lines 24-26). For stack operations and branches, they are used to build a symbolic expression (lines 28-29, 34-35). Method calls are evaluated recursively (lines 31-32). If the called method is instrumented, it will be transparent to the process since its operations will be evaluated using given symbolic inputs and shared heap memory. The results of stack operations and method calls are pushed onto the stack (lines 28-29, 31-32). Branching expressions are added to the path condition (lines 34-35). Finally, at the end of the method (line 21) the remaining value on the expression stack is popped off and returned to the caller (line 22).

4.3 Evaluation of Results and Input Generation

As a result of executing the method under test and the post-method, a symbolic path condition (pc), post-method Boolean return value (is_valid), and post-method path condition (pc_post) have been collected. From these three values CCUJ can determine the next course of action.

In the simplest case, is_valid is false (FIG. 5, line 13) indicating that the model's OCL constraint on the method under test has been violated by the test case value. If this occurs then the error is reported and the process terminates.

If the post-method returns true, then the test case value does not violate the constraint, but that does not mean that another input on the same path could not cause a violation. To test for this possibility CCUJ tests the path conditions collected with a SAT solver, a Boolean satisfaction and optimization library in Java (FIG. 5, line 16). For this purpose the Sat4j SAT solver described in Le Berre, D., Parrain, A. The Sat4j Library, Release 2.2 Journal of Satifiability, Boolean Modeling and Computation 7, 59-64 (2010). If the SAT solver finds that pc→pc_post is a tautology, that is ¬(¬pc ∨ pc_post) is not satisfiable, then all test case values satisfying the same path condition will satisfy the post-path condition as well and, thus, will satisfy the model's constraint. If this is the case, then CCUJ attempts to find a different test case value that would execute a different execution path in the method under test. To do so, CCUJ uses back-tracking technique to negate one sub-condition of pc and sends the new formula to Sat4j. The returned assignments by Sat4J are stored in init_values. (FIG. 5, line 18-22)

If pc→pc_post is not a tautology, that is ¬(¬pc ∨ pc_post) is satisfiable, then there exists a test case value that follows the same path in the method under test, but not in the post-method. Therefore, CCUJ tries to generate such a set of test values by solving the formula pc ∧ ∧ pc_post via the back-tracking technique with Sat4j (FIG. 5, line 24-28). If a solution is found, CCUJ uses it to generate new possible test case values and repeats the testing process until no further test case values can be found.

5. Experiments

In order to validate the CCUJ approach, we conducted two kinds of experiments. First is the effectiveness experiment. Effectiveness can be observed by the ability of CCUJ to find real faults confirmed by developers in some industrial-strength software systems. The other type of experiment is concerned with evaluating the efficiency of CCUJ by comparison with some more established approaches.

5.1 Effectiveness

Figure 7:
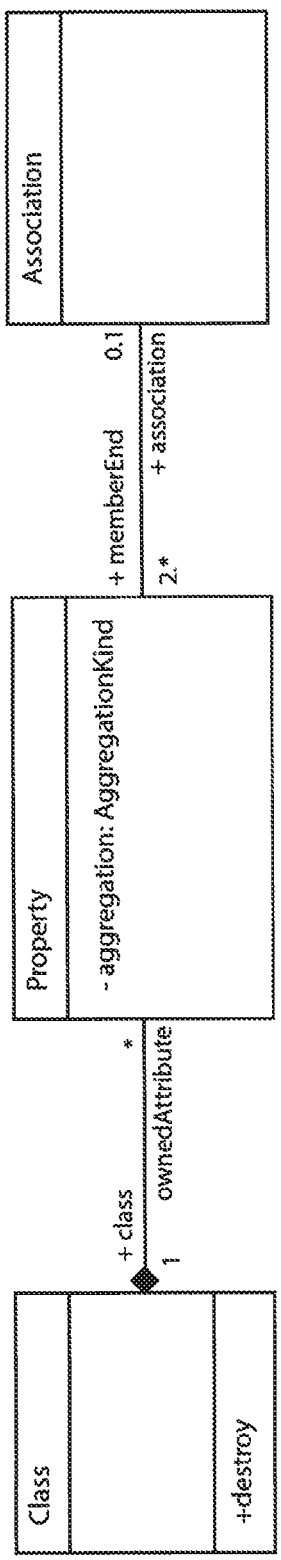
FIG. 7 is a class diagram fragment of the UML specification.

When we studied the UML specification, we found that many existing approaches that claimed to recover UML composition by reverse engineering from a Java program do not strictly follow the semantics of UML composition, The UML specification requires that if a composite is deleted, all of its parts are normally deleted with it. Note that a part can (where allowed) be removed from a composite before the composite is deleted, and thus not be deleted as part of the composite. For more information regarding this aspect of the UML specification, reference may be had to OMG Unified Modeling Language (OMG UML) Superstructure Specification (version 2.4.1). Tech. rep. Object Management Group, p. 41 (2011). However, many existing approaches require that all part objects cannot be accessed by any object except for its owner object. In fact, this is not the case. For instance, the class diagram excerpted from the UML specification in FIG. 7 shows that an object of class Property, which is owned by an object of class Class, can be accessed by an object of class Association. Therefore, when an owner object does not exist, all of its owned objects should not exist. Namely, all the links to the owned objects from other live objects should be removed. Assume method destroy( ) intends to implement the deletion of an owner object, FIG. 8 (*a*) shows the property as a post-condition after method destroy( ) is called on an owner object.

After the above observation, we tried CCUJ on one of the UML2 projects, i.e. the UML2 v1.1.1 implementation. CCUJ did detect the implementation error of all fields derived from UML composition and was confirmed with one of UML2 project members. The root cause of the implementation error is that the destroy( ) method iteratively checks each object contained in the resource, which is supposed to contain all the instantiated objects, and remove their links to the owned objects being destroyed. But the resource object, as part of EMF metamodel, did not automatically store all instantiated owned objects in the resource object appropriately.

TABLE 2

The comparison based on the Royal and Loyal and Binary Tree examples

| Test | No. Classes | Number of Test Cases | | Glass Box | Black Box |
|---|---|---|---|---|---|
| | | CCUJ | Finitazation | | |
| BinaryTree::orderChildren( ) | 2 | 4 | 3 | 27 | 19683 |
| | | 4 | 4 | 64 | 262144 |
| | | 4 | 5 | 125 | 1953125 |
| LoyaltyAccount::earn(i: Integer) | 9 | 4 | 3, 2* | 54 | 39366 |
| | | 4 | 4, 2* | 128 | 524288 |
| | | 4 | 5, 2* | 250 | 3906250 |

*Object and integer finitization

We also applied CCUJ to the UML2 project v4.0.2 checking some OCL constraints in the UML specification, CCUJ detected an error on the implementation of the method isAttribute( ) in class Property. The OCL post condition for the method is shown in FIG. 8 (b). For more information regarding this aspect of the UML specification, reference may be had to OMG Unified Modeling Language (OMG UML) Superstructure Specification (version 2.4.1). Tech. rep. Object Management Group, p. 125 (2011). The problem was caused by the implementation only checking non-navigable inverse references to property p, this is, references in which an object (obj1) can access p, but p cannot directly access the object obj1. Since the reference attribute in class Classifier is a navigable inverse reference, it was ignored, and the method failed to return true when c.attribute->includes (p) is true.

TABLE 3

UML specification test case generation comparison

| Test | No. | Numberof Test Cases | | | Black Box |
|---|---|---|---|---|---|
| | | CCUJ | Finitazation | Glass | |
| Classifier::maySpecializeType( ) | 4 | 3 | 3 | 3 | 6561 |
| | 4 | 3 | 4 | 4 | 65536 |
| | 4 | 3 | 5 | 5 | 390625 |
| StateMachine::ancestor( ) | 8 | 10 | 3 | 27 | 6561 |
| | 8 | 10 | 4 | 64 | 65536 |
| | 8 | 10 | 5 | 125 | 390625 |
| Classifier::isTemplate( ) | 4 | 6 | 3 | 108 | 2916 |
| | 4 | 6 | 4 | 256 | 16384 |
| | 4 | 6 | 5 | 500 | 62500 |
| Element::destroy( ) | 3 | 3 | 3 | 27 | 531441 |
| | 3 | 3 | 4 | 64 | 16777216 |
| | 3 | 3 | 5 | 125 | 244140625 |

Efficiency

To determine the efficiency, we compare CCUJ with the glass box testing approach and the Korat testing approach, in terms of the number of generated test cases. The Glass Box testing approach and the Korat testing approach are two prominent approaches, More information about these approaches may be found at Darga, P., Boyapati, C. *Efficient Software Model Checking of Data Structure Properties*, Proceedings of the 21$^{st}$ Annual ACM SIGPLAN Conference on Object-oriented Programming Systems, Languages and Applications, New York, N.Y., pp. 363-382 (2006); and Boyapati, C. Khurshid, S., Marinov, D. Korat: Automated Testing Based on Java Predicates, Proceedings of the 2002 ACM SIGSOFT International Symposium on Software Testing and Analysis, New York, N.Y., pp. 123-133 (2002).

One reason for this selection is that these two approaches consider different methods to generate test case values. The number of test cases determines the number of times that the method under test must be executed. Since CCUJ achieves branch coverage, the smaller the number of necessary test cases, the greater the efficiency. Our approach achieves a good efficiency without sacrificing coverage criteria. The glass box approach, similar to CCUJ, considers the generation of test case values based on the execution of the method under test. In the case of Korat, only an invariant method, repOk( ), is considered in the generation of test case values. Both of Korat and the glass box testing approach use finitization to limit the number of values that can be assigned to a field. Thus, the number of possible test case values can be reduced. Furthermore, both Korat and the glass box prunes the fields not touched during the execution so the test case values can be further reduced. In order to run Korat, we converted the multiplicity and navigability constraints into the invariant method repOk( ) in each class. Table 2 shows the results of the three approaches in terms of the number of test case values being generated for the Royal and Loyal example and Binary tree example.

Likewise, we compared the three approaches based on the UML specification. In this regard, the UML2 Specification, available as the OMG Unified Modeling Language (OMG UML) Superstructure Specification (version 2.4.1). Tech. rep. Object Management Group, p. 125 (2011), describes in FIGS. 15.2 and 7.9 of that specification a partial metamodel. We studied that partial metamodel, and considered the methods maySpecializeType( ), ancestor( ), isTemplate( ), and destroy( ), described on pages 54, 565 of that UML2

Specification. Because both Korat and the glass box approaches generate a large number of test case values quickly, we only considered a small number of classes related to these four methods. Table 3 shows a comparison result of these approaches in the UML specification.

Figure 9:
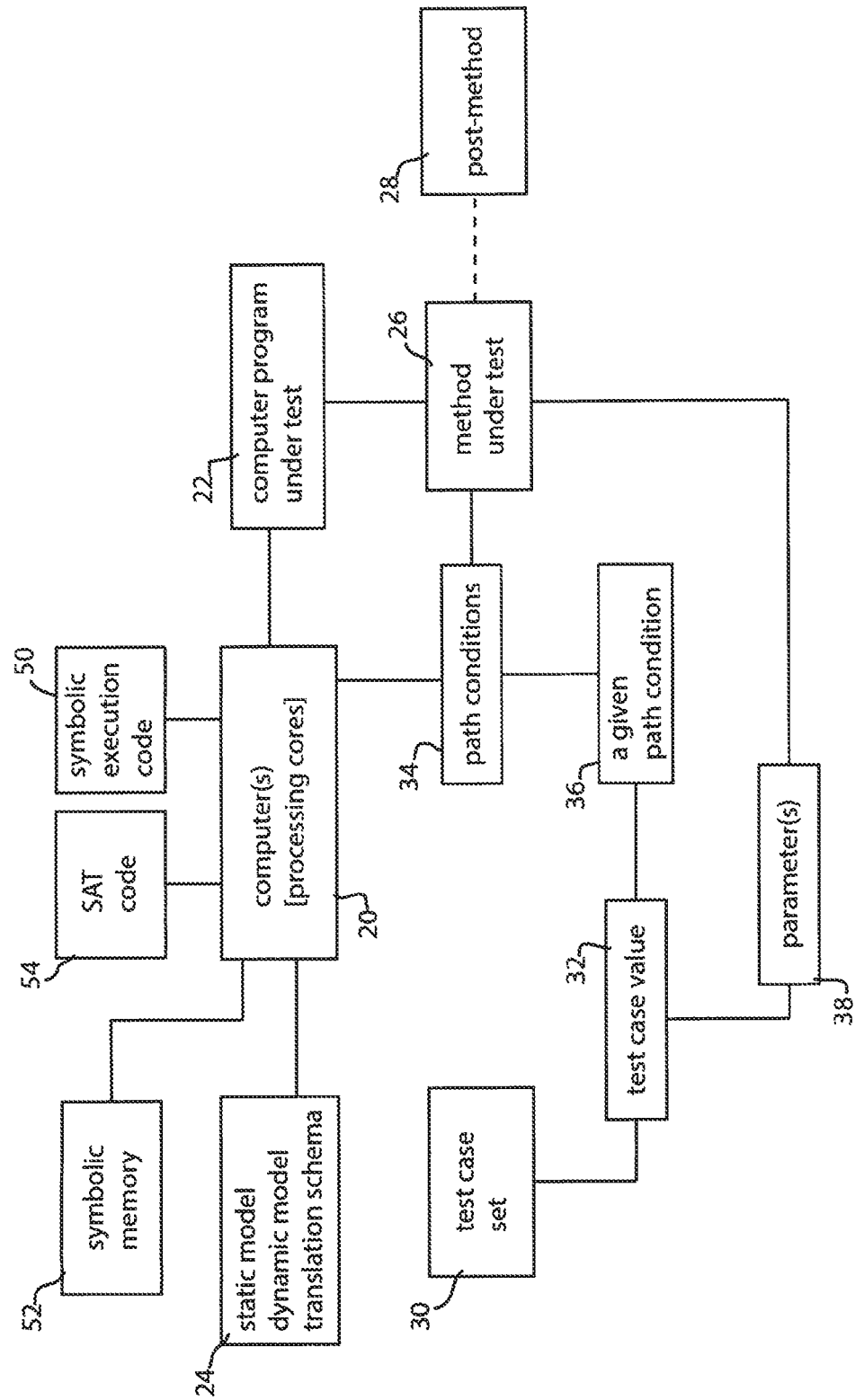
FIG. 9 is a computer implementation diagram, illustrating how the computer memory may be configured to perform the method of testing a computer program implementation.

Referring now to FIG. 9, some further details of the computer-implemented embodiment of the test system will now be described. For purposes of explanation here, a single computer (comprising one or more processing cores) has been illustrated. However, it will be understood that, if desired, individual steps of the method of testing may be performed using separate computers, where the results generated by one computer are shared with another computer to carry out the processing steps in a distributed fashion. Therefore, FIG. 9 has been somewhat simplified, as depicting a single box 20 representing computer(s) having one or more processing cores. To begin the method of testing a computer program under test, the program is stored in computer memory as at 22. Also stored in memory as at 24 are the static model component and dynamic model component of the computer program under test as well as the translation schema Φ, discussed above. As used herein, all computer memory is considered as non-transitory, in the sense that information is stored in a physical device (e.g., RAM, Flash RAM, hard disk, etc.) during the time such information is needed to complete the processing calculations described here.

The computer, optionally with guidance by a human operator, selects a method under test from among the methods that make up the program under test. The selected method under test is stored in memory as at 26. The method under test may either stored separately in memory from the program under test, or identified by storing pointers its location within the program under test.

The computer 20 uses the dynamic model stored at 24 and generates a post-method corresponding to the method under test identified in memory at 26. The post method is stored in memory at 28.

Next a set of high quality test cases are generated by the computer, using the models stored at 24. This set of test cases, represented generally at 30 comprise one or more individual test case values 32, where each test case value corresponds to a given path condition 36, selected from the set of path conditions 34 that represent all possible different logic flow or programmatic flow that a computer may take when executing the program under test. Each test case value 32 has one or more parameter values 38, which correspond to the actual values or states of variables defined by the method under test.

The computer 20 begins an iterative process of exploring different execution paths for both the method under test and its corresponding post-method. Processing begins by using an initial set of test case values 32, which in turn have an initial set of parameter(s) that are supplied by the computer 20 to the method under test, and to the post-method as applicable.

The computer 20 includes executable program code 50 by which it performs symbolic execution of the method under test and the post-method, using the initial set of parameter(s) corresponding to the initial test case value. More specifically, the executable program code 50 causes the computer 20 to insert program execution state data collection "breakpoints" that capture information about the method under test (and also the post-method) as execution proceeds. This is referred to above as "instrumentation." The results of such symbolic execution are stored for analysis at 52 as a symbolic memory representation corresponding to a first execution path (the path the method under test (or post-method) actually took using the initial test case value. In this regard, when the post-method is symbolically executed, the symbolic memory representation generated while executing the method under test may be used, as the structure of the post-method is related to the structure of the method under test from which it was derived.

Once the symbolic execution has been completed for the first iteration (using the initial test case values) the computer 20 analyzes the results as follows. First computer 20 tests the returned Boolean state of the post-method. Note that the post-method is specifically constructed to "return" a Boolean state of either TRUE or FALSE. Thus this return value is tested. A return of FALSE indicates that an error has been detected. A return of TRUE indicates that further analysis will be performed as follows.

The computer 20 includes executable program code 52 by which the computer implements a satisfiability solver algorithm (SAT). The SAT algorithm analyzes whether all members of the input parameter set (in this case the initial parameter or parameters) which satisfy the path condition (PC) also satisfy the post-path condition (PCpost), and in this way determine if PC and PCpost correspond to a tautology relationship. The computer 20 then analyzes that relationship. At least two scenarios are considered:

Analysis Scenario A. If a tautology relationship is found, the computer 20 generates a second test case value, different from the initial test case value and runs the instrumented method under test and post-method again using an execution path for the method under test that is different from the first execution path condition. Specifically, the method under test is caused to follow an execution path that is different from the prior path taken. The path taken by the post-method, however, can follow the prior path taken for scenario A.

Analysis Scenario B. If a tautology relationship is not found, the computer generates a third test case value, having a parameter set different from the initial parameter set. In Scenario B, the computer forces the post-method to follow a different execution path than the prior path; however the method under test is permitted, in this case, follow the prior execution path.

The computer repeats the above algorithm iteratively until all an error condition is found or until all possible execution path cases have been explored. However, unlike brute-force methods performed by conventional computer program testing algorithms, the process described here is far more efficient. By taking post-condition dynamics into account, the disclosed algorithm effectively prunes many redundant or "impossible" search paths, while benefiting from the ability to identify errors in implementation that are impossible to find by brute-force analysis.

While CCUJ considers Java as an implementation language, some other object-oriented programming languages such as C# can also use the CCUJ approach. In this case, CCUJ should be adjusted to accommodate the changes in a new programming language that is different from Java, such as, the generation of the post-method in a different target language, and the use of a different instrumentation API and symbolic execution tool. The most important contribution of CCUJ is still its approach for efficiently checking the conformance between a UML class diagram and implementation in an object-oriented language.

In conclusion, CCUJ was able to effectively and efficiently perform conformance checking between UML and Java. As future work we plan to extend our approach to consider floating point number during the test case generation by simulating the continuous values with the use of step functions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of testing a computer program implementation according to a predefined design model, the design model being of the type having a static model component and a dynamic model component, comprising:
    identifying a method under test from within the computer program implementation;
    using a computer to extract the dynamic model component and generate a post-method corresponding to the method under test;
    using a computer to store an initial test case value having a corresponding initial input parameter set comprising at least one parameter;
    using a computer to instrument for symbolic execution both the method under test and the post-method;
    using a computer to run the instrumented method under test and to build a first symbolic memory representation corresponding to a first execution path condition of the method under test, the first symbolic memory representation being stored in non-transitory computer-readable memory as a path condition (PC);
    using a computer to run the instrumented post-method, and using the first symbolic memory representation to build a second symbolic memory representation corresponding to the post-method, the second symbolic memory representation being stored in non-transitory computer-readable memory as a post-method path condition (PCpost);
    using a computer to test the returned Boolean state of the post-method path condition and store an indication in computer memory that an error has been detected if the returned Boolean state is FALSE and to perform the following steps if the returned Boolean state is TRUE;
    using a computer to execute a satisfiability (SAT) solver algorithm to analyze whether all members of the input parameter set satisfying the path condition PC also satisfy the post-path condition PCpost and thereby determine that PC and PCpost correspond to a tautology relationship;
    using a computer to further evaluate the relationship between PC and PCpost as follows:
    if a tautology relationship is found, generate a second test case value, different from the initial test case value and run the instrumented method under test and post-method again using an execution path for the method under test that is different from the first execution path condition;
    if a tautology relationship is not found, generate a third test case value, having a parameter set different from the initial parameter set.

2. The method of claim 1 wherein the second test case value is used to run the post-method again using the first execution path condition.

3. The method of claim 1 wherein the second test case value is used to run the post-method again using an execution path condition that is different from the first execution path condition.

4. The method of claim 1 wherein the third test case value is used to run the instrumented method under test using the first execution path condition.

5. The method of claim 1 wherein the third test case value is used to run the post-method again using and execution path for the post-method that is different from the first execution path condition.

6. The method of claim 1 wherein the static model component is expressed using a modeling language and the dynamic model component is expressed using an object constraint language.

7. The method of claim 6 wherein the post-method is generated by the computer scanning the object constraint language expression of the dynamic model and generating an abstract syntax tree that is then traversed to form a Boolean method corresponding to the method under test.

8. The method of claim 1 wherein the program implementation is an object oriented language.

9. The method of claim 1 wherein the program implementation is a Java language implementation, where the static model component is expressed using a unified modeling language (UML) representation and the dynamic model component is expressed using an object constraint language (OCL) representation.

10. An apparatus for testing a computer program implementation according to a predefined design model, the design model being of the type having a static model component and a dynamic model component, comprising:
    at least one processor programmed to extract the dynamic model component and to generate and store in memory coupled to said processor a post-method representation corresponding a method under test;
    at least one processor programmed to store an initial test case value having a corresponding initial input parameter set comprising at least one parameter;
    at least one processor programmed to instrument for symbolic execution both the method under test and the post-method;
    at least one processor programmed to run the instrumented method under test and to build a first symbolic memory representation corresponding to a first execution path condition of the method under test, the first symbolic memory representation being stored in non-transitory computer-readable memory as a path condition (PC);
    at least one processor programmed to run the instrumented post-method, and using the first symbolic memory representation to build a second symbolic memory representation corresponding to the post-method, the second symbolic memory representation being stored in non-transitory computer-readable memory as a post-method path condition (PCpost);
    at least one processor programmed to test the returned Boolean state of the post-method path condition and store an indication in computer memory that an error has been detected if the returned Boolean state is FALSE and to perform the following steps if the returned Boolean state is TRUE;
    at least one processor programmed to execute a satisfiability (SAT) solver algorithm to analyze whether all members of the input parameter set satisfying the path condition PC also satisfy the post-path condition PCpost and thereby determine that PC and PCpost correspond to a tautology relationship;

the at least one processor programmed to further evaluate the relationship between PC and PCpost as follows:

if a tautology relationship is found, generate a second test case value, different from the initial test case value and run the instrumented method under test and post-method again using an execution path for the method under test that is different from the first execution path condition;

if a tautology relationship is not found, generate a third test case value, having a parameter set different from the initial parameter set.

11. The apparatus of claim 10 wherein the second test case value is used to run the post-method again using the first execution path condition.

12. The apparatus of claim 10 wherein the second test case value is used to run the post-method again using an execution path condition that is different from the first execution path condition.

13. The apparatus of claim 10 wherein the third test case value is used to run the instrumented method under test using the first execution path condition.

14. The apparatus of claim 10 wherein the third test case value is used to run the post-method again using an execution path for the post-method that is different from the first execution path condition.

15. The apparatus of claim 10 wherein the static model component is expressed using a modeling language and the dynamic model component is expressed using an object constraint language.

16. The apparatus of claim 15 wherein the post-method is generated by the computer scanning the object constraint language expression of the dynamic model and generating an abstract syntax tree that is then traversed to form a Boolean method corresponding to the method under test.

17. The apparatus of claim 10 wherein the program implementation is an object oriented language.

18. The apparatus of claim 10 wherein the program implementation is a Java language implementation, where the static model component is expressed using a unified modeling language (UML) representation and the dynamic model component is expressed using an object constraint language (OCL) representation.

* * * * *